United States Patent Office 3,772,347
Patented Nov. 13, 1973

3,772,347
TRANSITION METAL CATALYZED SILYLATIONS
William H. Atwell and Gary N. Bokerman, Midland, Mich., assignors to Dow Corning Corporation, Midland, Mich.
No Drawing. Filed Dec. 15, 1971, Ser. No. 208,413
Int. Cl. C07f 7/12
U.S. Cl. 260—448.2 E        8 Claims

ABSTRACT OF THE DISCLOSURE

The reaction between disilanes and hydrocarbon chlorides to produce $R'_nSiCl_{4-n}$ is catalyzed with M', $$M(PR''_3)_2X_2$$

or $M'(PR''_3)_2Si(R_aCl_{3-a})_mX_{2-m}$. Specifically, hexachlorodisilane is reacted with allyl chloride in the presence of $Pd\{P(CH_3)_2C_6H_5\}_2Cl_2$ to give allyl trichlorosilane.

---

The primary commercial method for producing hydrocarbon halosilanes involves the reaction of hydrocarbon halides with elemental silicon. After the desired monomeric hydrocarbyl halosilanes have been distilled there remains a high boiling residue which is a complex mixture of byproducts for which there is little, if any, commercial use. One of the primary ingredients of the residue are disilanes of the formula $R_nSi_2Cl_{6-n}$.

This invention relates to a method of converting these disilanes to comemrcially useful monomeric halosilanes, thereby reducing the amount of waste product, which among other things, presents a troublesome disposal problem. These disilanes are converted to monomeric silanes which are of known commercial importance.

This invention relates to the method comprising reacting a silane of the formula $R_nSi_2Cl_{6-n}$ with a halide of the formula $R'Cl$ in the presence of a catalyst of the group consisting of transition metal complexes of the formula $M(PR''_3)_2X_2$ and $(R''_3P)_2M'Si(R_aCl_{3-a})_mX_{2-m}$ and M' whereby silanes of the formula $R'R_bSiCl_{3-b}$ are obtained in which R is a monovalent hydrocarbon radical of from 1 to 18 carbon atoms,
R' is hydrogen or a monovalent hydrocarbon radical or an alkoxymethyl radical of from 1 to 18 carbon atoms,
R'' is a hydrocarbon radical of from 1 to 10 carbon atoms,
X is a halogen atom other than fluorine,
M is Pt, Pd or Ni,
M' is Pt or Pd,
n is an integer from 0 to 6,
m is an integer from 1 to 2,
a is an integer from 0 to 1, and
b is an integer from 0 to 3.

The basic reaction in this invention involves the splitting of the Si—Si bond in the disilane with the formation of a silicon-carbon bond and a silicon-chlorine bond. The reaction can be represented schematically as $$\equiv SiSi\equiv + R'Cl \rightarrow \equiv SiR' + \equiv SiCl$$

This reaction is carried out by mixing the reactants in the presence of the catalyst and heating at the desired temperature.

The disilanes used in this invention are known materials and they can be isolated from the high boiling residue formed by reacting RCl with silicon in the so-called direct process for making chlorosilanes or they can be prepared by reaction of an alkali metal with two moles of the corresponding halosilane. The latter is the classic method for making SiSi compounds.

The metals Pt and Pd can be used per se in any finely divided form. They can be employed if desired on supports such as carbon or silica gel. The phosphine metal complexes used herein are well known. Briefly, the latter can be prepared by reacting the corresponding trihydrocarbyl phosphine with an alkali metal salt of the corresponding chlorometallic acid, i.e.

$$R''_3P + K_2PtCl_4 \rightarrow (R''_3P)_2PtCl_2 + 2KCl$$

The silylated complexes used in this invention can be prepared in a number of ways. Two such ways are described in applicant's copending application entitled "Synthesis of Silyl Metallic Complexes," Ser. No. 208,414, filed Dec. 15, 1971 which application is hereby incorporated in this application by reference. Briefly, one method involves the reaction of $M(PR''_3)_2X_2$ with the disilanes described herein or reaction of the phosphine metalic complex with hydrosilanes of the formula $HSiR_nX_{3-n}$. The reactions are (1)    $\equiv SiSi\equiv + M(PR''_3)_2X_2 \rightarrow M(PR''_3)_2(Si\equiv X)$ or $$M(PR''_3)_2(Si\equiv)_2 + SiX$$

or (2)    $2HSi\equiv + M(PR''_3)_2X_2 \rightarrow$
$$M(PR''_3)_2(Si\equiv)X + SiX + H_2$$

The amount of catalysts employed in this invention is not critical, however, obviously one employs a catalyst in as small a concentration as possible. It has been found that from 1 to one-tenth mole percent or less of the catalyst based on the moles of reactants is sufficient. The best catalyst to employ with any specific reaction varies with the type of disilane and the activity of the hydrocarbon halide used. In general, the metal or the metal on a support such as carbon works best with those disilanes having more than three R groups and works best at temperatures above 150° C.

The reaction can be run at from room temperature to the decomposition temperature of the reactants. In general, a temperature from room temperature to 200° C. is best. The reaction can also be carried out at atmospheric, sub-atmospheric or super-atmospheric pressure.

If desired, inert solvents can be employed in order to facilitate mixing of the ingredients. However such solvents are not required. Suitable solvents include benzene, toluene, aliphatic hydrocarbons and the like.

For the purpose of this invention R and R' can independently be any monovalent hydrocarbon radical such as alkyl radicals such as methyl, ethyl, isopropyl and octadecyl; alkenyl radicals such as vinyl, allyl, hexenyl or octadecenyl; cycloaliphatic radicals such as cyclopentyl, cyclohexyl, cyclohexenyl or methylcyclohexyl; aralkyl radicals such as benzyl, beta-phenylethyl or beta-phenyl propyl and aryl radicals such as phenyl, xenyl, naphthyl, anthracyl, tolyl or xylyl. R' can also be any alkoxy methyl radical of the formula $BOCH_2$— where B is any of the alkyl radicals shown above.

R'' can be any monovalent hydrocarbon radical having from 1 to 10 carbon atoms such as methyl, ethyl, isopropyl, decyl, vinyl, allyl, hexenyl, cyclopentyl, cyclopentenyl, cyclohexyl, methyl cyclohexyl, benzyl, beta-phenyl ethyl, beta-phenylpropyl, phenyl, naphthyl, tolyl or xylyl.

The following examples are illustrative only but should not be construed as limiting the invention which is properly delineated in the appended claims.

EXAMPLE 1

In each case below equal molar amounts of the disilane and allyl chloride were reacted at the temperatures shown in a closed container in the presence of the catalyst shown. The amount of catalyst used is given in mole percent based on the moles of disilane. The following abbreviations are used hereinafter; Bu for butyl, Ph for phenyl, and Me for methyl.

TABLE

| Disilane | Catalyst | Mole percent catalyst | Reaction conditions | Product |
|---|---|---|---|---|
| $Si_2Cl_6$ | $Ni(PBu_3)_2Cl_2$ | 1.0 | 50° C. for 48 hrs | 83% $C_3H_5SiCl_3$ |
| $Si_2Cl_6$ | $Pd(PPhMe_2)_2Cl_2$ | 2.0 | 90° C. for 5 hrs | 77% $C_3H_5SiCl_3$ |
| $Si_2Cl_6$ | $Pt(PPhMe_2)_2Cl_2$ | 0.1 | 100° C. for 16 hrs | 89% $C_3H_5SiCl_3$ |
| $Si_2Cl_6$ | 10% Pd/C | 0.1 | 100° C. for 48 hrs | 82% $C_3H_5SiCl_3$ |
| $Si_2Cl_6$ | 5% Pt/C | 0.1 | 150° C. for 48 hrs | 60% $C_3H_5SiCl_3$ |
| $Me_2Si_2Cl_4$ | $Pd(PPhMe_2)_2Cl_2$ | 0.1 | 100° C. for 24 hrs | 80% $C_3H_5MeSiCl_2$ |
| $Me_2Si_2Cl_4$ | 10% Pd/C | 0.1 | 100° C. for 16 hrs | 81% $C_3H_5MeSiCl_2$ |
| $Me_3Si_2Cl_3$ | $Pd(PPhMe_2)_2(SiMeCl_2)_2$ | 0.1 | 100° C. for 7.5 hrs | 81% $C_3H_5MeSiCl_2$ |
| $Me_3Si_2Cl_2$ | ---------- | ---- | 100° C. for 42 hrs | No reaction. |
| $Me_4Si_2Cl_2$ | $Pd(PBu_3)_2Cl_2$ | 0.1 | 130° C. for 86 hrs | 70% $C_3H_5Me_2SiCl$ |
| $Me_6Si_2$ | 10% Pd/C | 0.1 | 100° C. for 8 hrs | 94% $C_3H_5SiMe_3$ |

EXAMPLE 2

Equal molar amounts of the reactants shown below were heated in the presence of the catalyst shown, as in Example 1.

TABLE

| Reactants | | Catalyst | Mole percent catalyst | Reaction conditions | Product |
|---|---|---|---|---|---|
| Silane | Halide | | | | |
| $Si_2Cl_2$ | PhCl | 10% Pd/C | 1.0 | 200° C. for 74 hrs | 85% $PhSiCl_3$ |
| $Si_2Cl_2$ | PhCl | ---------- | ---- | 200° C. for 77 hrs | No reaction. |
| $Me_2Si_2Cl_4$ | PhCl | 10% Pd/C | 1.0 | 200° C. for 24 hrs | 46% $PhMeSiCl_2$ |
| $Si_2Cl_6$ | BuCl | 10% Pd/C | 1.0 | 200° C. for 16 hrs | 88% $BuSiCl_3$ |
| $Si_2Cl_2$ | $PhCH_2Cl$ | $Ni(PBu_3)_2Cl_2$ | 1.0 | 30° C. for several wks | 12% $PhCH_2SiCl_3$ |
| $Si_2Cl_6$ | $MeOCH_2Cl$ | $Ni(PBu_3)_2Cl_2$ | (¹) | 100° C. for 24 hrs | $MeOCH_2SiCl_3$ |

¹ Small amount.

EXAMPLE 3

This example shows the operativeness of the process using HCl as one reactant. 51.9 g. of a disilane mixture (the disilane used was a mixture of 60% by weight $Me_2Si_2Cl_4$, 20% by weight $Me_3Si_2Cl_3$ and 9% by weight $Me_4Si_2Cl_2$) was mixed with 0.95 g. of $Pd(PPhMe_2)_2Cl_2$ and the mixture was heated at 150° C. and stirred as HCl was passed through the mixture at a rate of 21 millimoles per hour. The products were distilled from the reaction flask and condensed and analyzed by gas chromatography. There was obtained a product which was 24% by weight $MeHSiCl_2$, 1.3% by weight $Me_2HSiCl$, 54% by weight $MeSiCl_3$ and 15% by weight $Me_2SiCl_2$.

EXAMPLE 4

When the following hydrocarbon halides are reacted with the following disilanes in equal molar amounts, in the presence of 10% Pd/C in amounts of one mole percent Pd based on the moles of disilanes at 200° C., the following products are obtained:

| Hydrocarbon halide | Disilane | Product |
|---|---|---|
| $C_{18}H_{37}Cl$ | $Si_2Cl_6$ | $C_{18}H_{37}SiCl_3$ |
| $C_6H_{11}Cl$ | $(C_6H_{11})_2Si_2Cl_4$ | $(C_6H_{11})_2SiCl_2$ |
| $C_6H_9Cl$ | $(C_6H_9)_2Si_2Cl_4$ | $(C_6H_9)_2SiCl_2$ |
| $MeC_6H_4Cl$ | $(MeC_6H_4)_2Si_2Cl_4$ | $(MeC_6H_4)_2SiCl_2$ |
| $PhC_6H_4Cl$ | $Si_2Cl_6$ | $PhC_6H_4SiCl_3$ |
| (biphenyl)-Cl | $Si_2Cl_6$ | (biphenyl)-$SiCl_3$ |
| $Me_2CHCl$ | $Me_2Si_2Cl_4$ | $(Me_2CH)MeSiCl_2$ |
| BuCl | $(C_{18}H_{37})_2Si_2Cl_4$ | $(C_{18}H_{37})BuSiCl_2$ |
| MeCl | $Ph_2Si_2Cl_4$ | $PhMeSiCl_2$ |
| $C_2H_5Cl$ | $MeSi_2Cl_5$ | $C_2H_5SiCl_3$ and $MeSiCl_3$ |

EXAMPLE 5

When the following catalysts are employed in amounts of 1 mole percent based on the amount of disilane used, the following products are obtained:

TABLE

| Reactants | | Catalysts | Temperature of reaction, ° C. | Product |
|---|---|---|---|---|
| Halide | Silane | | | |
| $C_3H_5Cl$ | $Si_2Cl_6$ | $Pt\{P(C_{10}H_{21})_3\}_2Br_2$ | 50 | $C_3H_5SiCl_3$ |
| $PhCH_2CH_2Cl$ | $Me_2Si_2Cl_4$ | $Pd\{P(C_2H_5)_3\}_2I_2$ | 50 | $(PhCH_2CH_2)MeSiCl_2$ |
| $C_{10}H_{21}OCH_2Cl$ | $Si_2Cl_6$ | $Pd\{P(C_6H_4Me)_3\}_2Cl_2$ | 100 | $C_{10}H_{21}OCH_2SiCl_3$ |
| $C_2H_5OCH_2Cl$ | $Me_2Si_2Cl_4$ | $Pd\{P(C_5H_{11})_3\}_2Cl_2$ | 100 | $(C_2H_5OCH_2)MeSiCl_2$ |
| $C_3H_5Cl$ | $Si_2Cl_6$ | $Pd\{P(C_{10}H_9)_3\}_2Cl_2$ | 100 | $C_3H_5SiCl_3$ |
| $C_3H_5Cl$ | $Si_2Cl_6$ | $Pt\{P(CH_2Ph)_3\}_2Cl_2$ | 100 | $C_3H_5SiCl_3$ |
| $C_3H_5Cl$ | $Si_2Cl_6$ | $Pd(PBu_3)_2(SiPhCl_2)Cl$ | 100 | $C_3H_5SiCl_3$ |
| $C_3H_5Cl$ | $Si_2Cl_6$ | $Pd(PBu_3)_2(SiCl_3)_2$ | 100 | $C_3H_5SiCl_3$ |
| $C_3H_5Cl$ | $Si_2Cl_6$ | $Pd(PBu_3)_2(SiC_2H_3Cl_2)Cl$ | 50 | $C_2H_5SiCl_3$ |

EXAMPLE 6

A mixture of equimolar amounts of $Si_2Cl_6$ and allyl chloride and 1 mole percent Pd black based on the moles of allyl chloride was heated in a closed container 71 hours at 100° C. The yield of allyltrichlorosilane was determined by GLC to be 69% theory.

That which is claimed is:

1. A method comprising reacting a silane of the formula $R_nSi_2Cl_{6-n}$ with a halide of the formula $R'Cl$ in the presence of a catalyst of the group consisting of transition metal complexes of the formulae $M(PR''_3)_2X_2$ or $(R''_3P)_2M'Si(R_aCl_{3-a})_mX_{2-m}$ and $M'$ whereby silanes of the formula $R'R_bSiCl_{3-b}$ are obtained in which R is a monovalent hydrocarbon radical of from 1 to 18 carbon atoms, R' is hydrogen or a monovalent hydrocarbon radical or an alkoxymethyl radical of from 1 to 18 carbon atoms, R'' is a monovalent hydrocarbon radical of from 1 to 10 carbon atoms, X is a halogen atom other than fluorine, M is Pt, Pd or Ni, M' is Pt or Pd, n is an integer from 0 to 6, m is an integer from 1 to 2, a is an integer from 0 to 1, and b is an integer from 0 to 3.

2. A method according to claim 1 in which the silane is hexachlorodisilane.

3. The method according to claim 1 in which the silane is dimethyltetrachlorodisilane.

4. The method according to claim 1 in which the silane is trimethyltrichlorodisilane.

5. The method according to claim 1 in which the silane is tetramethyldichlorodisilane.

6. The method according to claim 1 in which the catalyst is M' on carbon support.

7. The method of claim 1 in which R' is a monovalent hydrocarbon radical.

8. The method of claim 6 in which R' is a monovalent hydrocarbon radical.

References Cited

UNITED STATES PATENTS

| | | | |
|---|---|---|---|
| 2,598,435 | 5/1952 | Mohler et al. | 260—448.2 E |
| 3,576,035 | 4/1971 | Atwell | 260—448.2 E X |
| 3,639,105 | 1/1972 | Atwell et al. | 260—448.2 E X |

DANIEL E. WYMAN, Primary Examiner

R. F. SHAVER, Assistant Examiner